(12) United States Patent
Cumbers

(10) Patent No.: US 7,628,383 B2
(45) Date of Patent: Dec. 8, 2009

(54) RACHET STRAP TIGHTENER AND MATING ROTARY DRIVEN TOOL

(75) Inventor: Ernest J. Cumbers, Winnipeg (CA)

(73) Assignee: Endurapak Inc., Winnipeg, CA (US)

( * ) Notice: Subject to any disclaimer, the term of this patent is extended or adjusted under 35 U.S.C. 154(b) by 20 days.

(21) Appl. No.: 12/060,921

(22) Filed: Apr. 2, 2008

(65) Prior Publication Data

US 2008/0263837 A1    Oct. 30, 2008

Related U.S. Application Data

(60) Provisional application No. 60/914,086, filed on Apr. 26, 2007.

(51) Int. Cl.
*B21F 9/00* (2006.01)
(52) U.S. Cl. .................. 254/243; 254/241; 254/360; 254/362; 410/100; 410/103; 279/144
(58) Field of Classification Search .............. 254/219, 254/223, 241, 243, 266, 360, 362; 410/156, 410/100, 103; 279/144
See application file for complete search history.

(56) References Cited

U.S. PATENT DOCUMENTS

| | | | | |
|---|---|---|---|---|
| 4,262,812 A | * | 4/1981 | Bremenkamp | 212/243 |
| 4,962,901 A | * | 10/1990 | Shirley et al. | 242/323 |
| 5,524,870 A | * | 6/1996 | Tallent et al. | 254/365 |
| 5,603,489 A | * | 2/1997 | Regal | 254/378 |
| 5,607,143 A | * | 3/1997 | Regal | 254/342 |
| 5,996,971 A | * | 12/1999 | Crouse | 254/371 |
| 6,102,637 A | * | 8/2000 | Mocci | 410/103 |
| 6,139,233 A | * | 10/2000 | Wilsey | 410/100 |
| 6,250,607 B1 | * | 6/2001 | Strom | 254/362 |
| 6,467,755 B2 | * | 10/2002 | Reilly et al. | 254/223 |
| 6,705,597 B1 | * | 3/2004 | Reilly et al. | 254/223 |
| 7,059,588 B2 | * | 6/2006 | Goulet | 254/323 |
| 7,410,336 B2 | * | 8/2008 | Parks | 410/156 |
| 7,464,916 B1 | * | 12/2008 | Drinkhorn | 254/243 |

* cited by examiner

*Primary Examiner*—Emmanuel M Marcelo
(74) *Attorney, Agent, or Firm*—Ade & Company Inc.; Ryan W. Dupuis; Kyle R. Satterthwaite

(57) ABSTRACT

A rachet strap tightener and a power driven rotary tool are arranged to be operated together for tightening a strap. The body of the power driven rotary tool is arranged to be anchored in mating engagement relative to the body of the rachet strap tightener, in addition to coupling the rotating mating parts of the tool and the strap tightener, such that the torque applied when winding the spindle of the tightener no longer acts to twist the tightener body from the user's hands but rather the torque is anchored directly through the bodies so that winding of the spindle with the power driven tool can be accomplished quickly, efficiently and in a safe manner.

17 Claims, 3 Drawing Sheets

RACHET STRAP TIGHTENER AND MATING ROTARY DRIVEN TOOL

This application claims the benefit under 35 U.S.C. 119(e) of U.S. provisional application Ser. No. 60/914,086, filed Apr. 26, 2007.

FIELD OF THE INVENTION

The present invention relates to a ratchet strap tightener and corresponding rotary driven tool, and more particularly the present invention relates to a method of operating the rachet strap tightener wherein a body of the rotary driven tool can be anchored to a body of the rachet strap tightener.

BACKGROUND

The use of rachet strap tighteners is common when transporting various types of cargo for snugly securing the cargo in place. A typically strap tightener includes a first strap connected at one end thereof which is anchored at a first location on the cargo and a spindle on an opposite end onto which a second strap may be wound for securement at a second location on the cargo. A racheting mechanism is typically selectively engaged with the spindle, that is that a user can select between an engaged position in which rotation of the spindle is only restricted in an unwinding direction of the strap from the spindle or a released position in which the spindle is free to be wound or unwound in either direction. When using a power tool to wind the spindle, the torque generated by the power tool acts on the body of the strap tightener, which before the strap is tightened is only loosely supported. This commonly causes the body of the tightener to be twisted from the user's hands causing disengagement of the spindle from the power driven tool. Accordingly mating connection of a power driven tool with a spindle of a strap tightener is often an awkward, time consuming task which is also potentially dangerous to the user operating the strap tightener.

SUMMARY OF THE INVENTION

According to one aspect of the invention there is provided a method of operating a rachet strap tightener using a power driven rotary tool, the rachet strap tightener comprising a tightener body, a spindle rotatably supported about a spindle axis relative to the tightener body for winding a first strap thereon in first direction, a first mating part rotatable with the spindle relative to the tightener body and a ratcheting mechanism arranged to selectively restrict rotation of the spindle relative to the tightener body in an opposing second direction, the power driven rotary tool comprising a tool body, a second mating part arranged to mate with the first mating part of the rachet strap tightener and arranged to be driven to rotate about a drive axis, the method comprising:

anchoring the tool body relative to the tightener body;

mating the second mating part of the rotary driven tool with the first mating part of the rachet strap tightener; and driving the second mating part of the rotary driven tool to rotate the spindle of the rachet strap tightener.

By anchoring the body of the tool to the body of the strap tightener in addition to coupling the rotating mating parts of the tool and the strap tightener, the torque applied when winding the spindle no longer acts to twist the tightener body from the user's hands but rather the torque is anchored directly through the bodies so that winding of the spindle with the power driven tool can be accomplished quickly, efficiently and in a safe manner.

One of the mating parts may comprise a bolt head and the other mating part may comprise a socket which matingly receives the bolt head therein.

Preferably the first mating part comprises a bolt head and the second mating part comprises a socket arranged to matingly receive the bolt head therein.

The method may include anchoring the tool body relative to the tightener body at a location which is spaced radially from the drive axis and by sliding the tool body towards the tightener body in a direction of the drive axis.

The method may further include anchoring the tool body relative to the tightener body by providing an anchoring member on one of the bodies and a receptacle on the other body which matingly receives the anchor member therein.

Preferably a receptacle on the tightener body is arranged to receive a portion of the tool body therein.

When the tightener body comprises a pair of side plates oriented perpendicularly to the spindle axis and spaced apart from one another along the spindle axis, the method may include providing an aperture in each of the side plates such that the apertures are aligned with one another along a receptacle axis which is parallel and spaced from the spindle axis to slidably receive a portion of the tool body therein.

The apertures may be located spaced between the spindle and a post arranged for anchoring a second strap thereon.

The tool body may be anchored relative to the tightener body by providing an anchor member on the tool body which is arranged to be received within a mating receptacle on the tightener body.

Preferably the anchor member extends generally parallel to the drive axis.

The anchor member preferably extends outwardly in a direction the socket member faces beyond the socket member.

The anchor member may be located on the body to be diametrically opposite from a handle of the tool arranged to be gripped by a hand of a user.

According to a second aspect of the present invention there is provided a rachet strap tightener for use with a power driven rotary tool comprising a tool body and a first mating part supported for rotation relative to the tool body about a drive axis, the rachet strap tightener comprising:

a tightener body;

a spindle rotatably supported on the tightener body for rotation relative to the tightener body about a spindle axis for winding a first strap thereon in first direction;

a second mating part rotatable with the spindle relative to the tightener body;

a ratcheting mechanism arranged to selectively restrict rotation of the spindle relative to the tightener body in an opposing second direction; and a receptacle on the tightener body arranged to matingly receive an anchor member on the tool body for anchoring the tightener body relative to the tool body.

The tightener body may comprise a pair of side plates oriented perpendicularly to the spindle axis and the receptacle may comprise an aperture in each of the side plates aligned with one another along a receptacle axis which is parallel and spaced from the spindle axis to slidably receive a portion of the tool body therein.

Preferably the receptacle is arranged to receive a portion of the tool body therein slidably along an axis lying parallel to the spindle axis.

According to a further aspect of the present invention there is provided a power driven rotary tool for use with a rachet strap tightener comprising a tightener body, a spindle rotatably supported on the tightener body about a spindle axis for winding a first strap thereon in first direction, a first mating part rotatable with the spindle relative to the tightener body, and a ratcheting mechanism arranged to selectively restrict rotation of the spindle relative to the tightener body in an opposing second direction, the power driven rotary tool comprising:

a tool body;

a second mating part supported for rotation relative to the tool body about a drive axis;

the second mating part being arranged to mate with the first mating part for rotation together about the drive axis; and an anchor member on the tool body arranged to being received in a mating receptacle on the tightener body for anchoring the tool body relative to the tightener body.

The anchor member may extend generally parallel to the drive axis.

The anchor member preferably extends outwardly in a direction the socket member faces beyond the socket member.

The anchor member may be located on the body to be diametrically opposite from a handle of the tool arranged to be gripped by a hand of a user.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
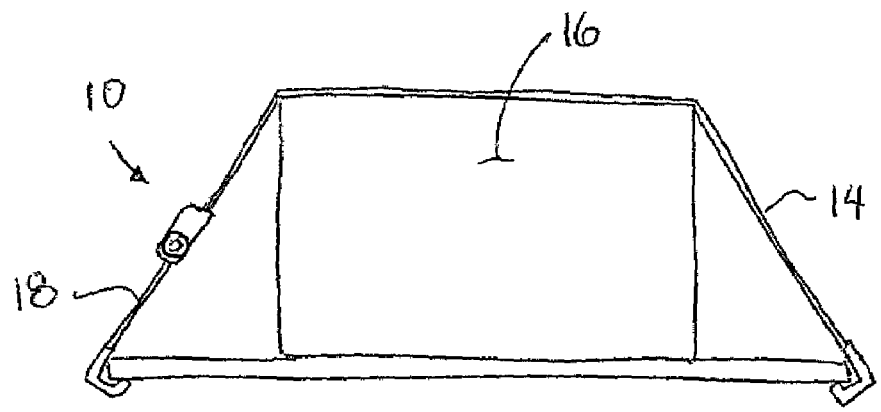
FIG. 1 is a side elevational view of a cargo item being secured with a strap tightener.
Figure 2:
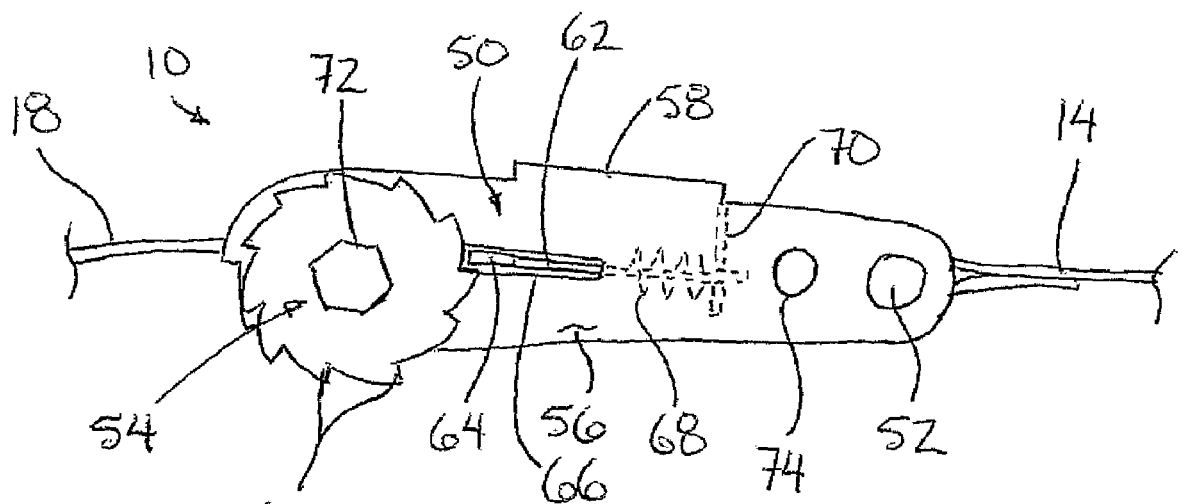
FIG. 2 is a side elevational view of an exemplary embodiment of the strap tightener according to the present invention.
Figure 5:
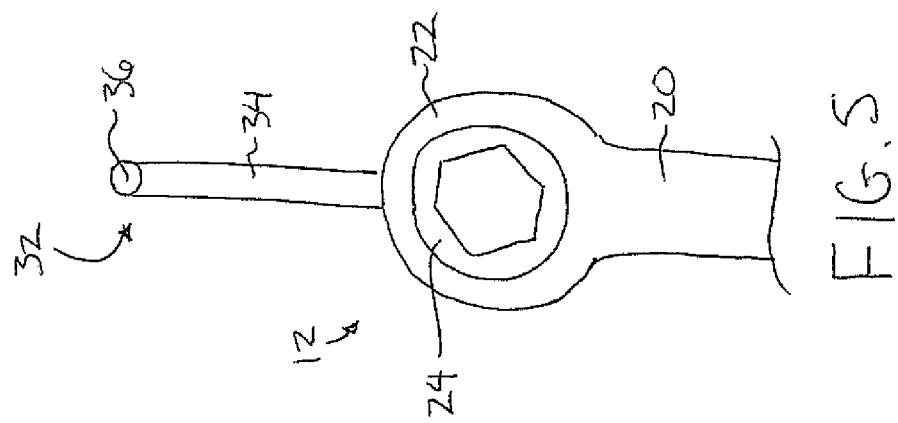
FIG. 5 is an end elevational view of the tool.
Figure 3:
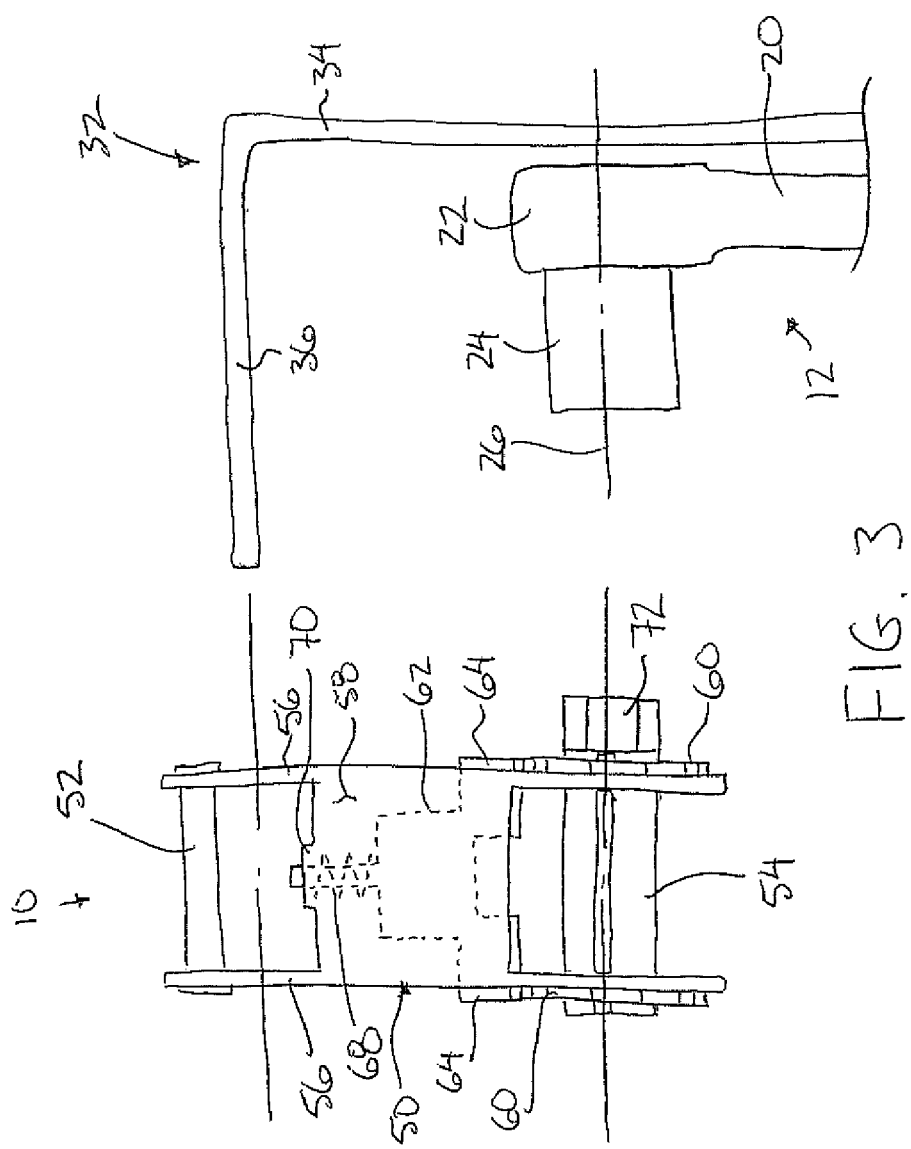
FIG. 3 is a plan view of the strap tightener according to the present invention in alignment with a rotary driven tool according to the present invention.
Figure 4:
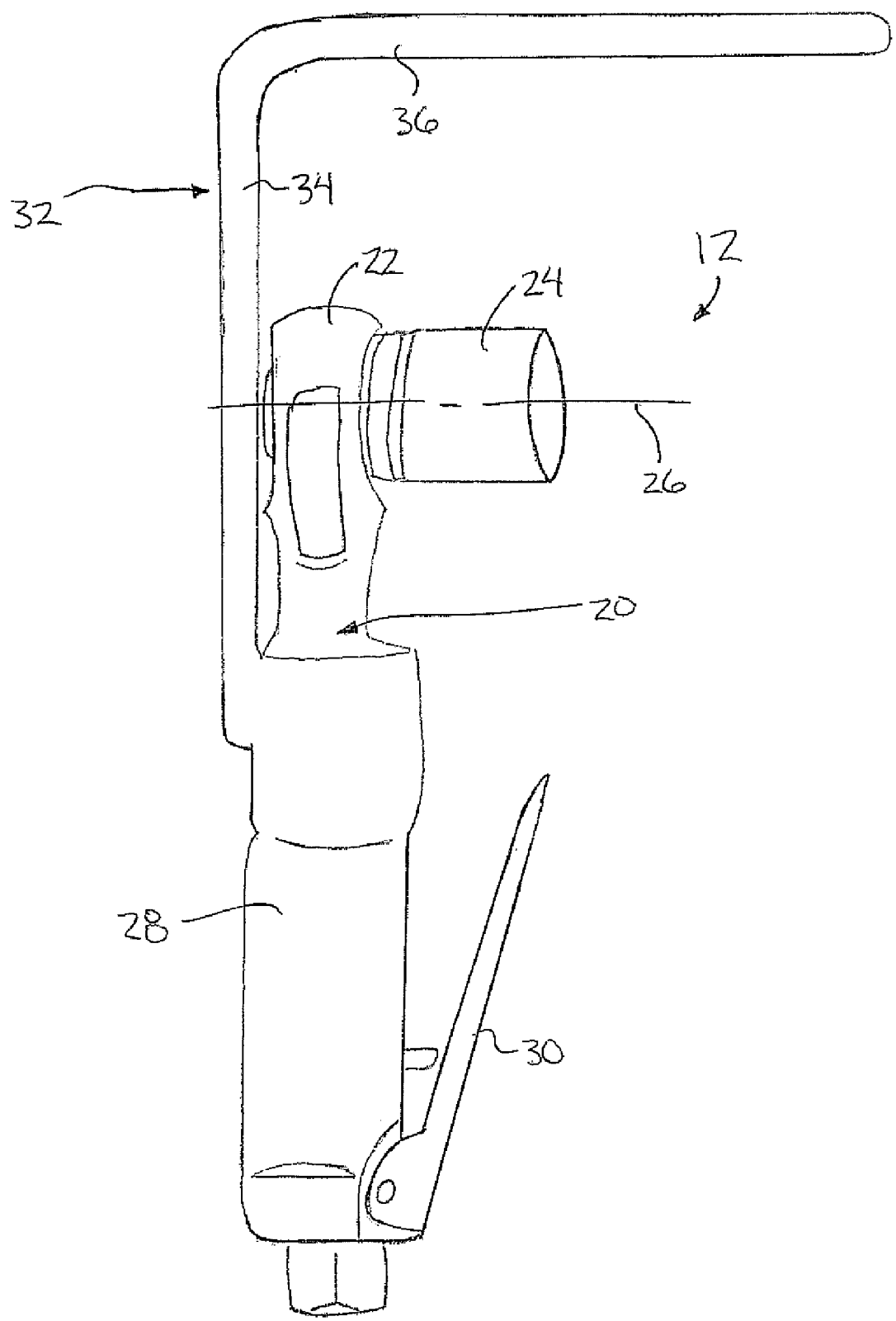
FIG. 4 is a side elevation view of the tool.

Referring to the accompanying figures there is illustrated a rachet strap tighener generally indicated by reference numeral 10. The tightener 10 is particularly suited for use with a rotary driven tool 12 of the type shown in the accompanying figures to tighten a strap having a first part 14 secured between the strap tightener 10 and a first location relative to a cargo item 16 to be secured and a second part 18 which is coupled between the tightener 10 and a second location relative to the cargo item 16 to be secured and which is arranged to be wound onto the strap tighener.

The tool 10 comprises an air powered rotary driven socket tool having a body 20 locating a rotary head 22 thereon. The rotary head is arranged to attach a socket member 24 thereon to rotate the socket member 24 about a socket axis 26 under power of compressed air. The socket member 24 is supported to face forwardly along the axis 26 away from the head 22. A handle 28 is coupled to the head 12 and forms a fixed portion of the body 20 which extends radially in a first direction from the rotary head 22. A lever 30 is operatively supported along side the handle 28 for engagement by the user to actuate rotation of the socket member 24 relative to the body 20.

The tool further comprises an anchor member 32 in the form of an elongate round rod which is rigid and fixed relative to the body 20. The anchor member includes a base bar 34 which extends radially from the socket axis 26 diametrically opposite the handle 28 to project outwardly beyond the rotary head 22 of the body. The anchor member further includes an anchor bar 36 coupled to the free outer end of the base bar at right angles thereto to extend parallel to the socket axis 26 from a location rearward of the socket head to project forwardly beyond the socket face from the body 20.

The rachet strap tightener includes a body 50 which extends in a longitudinal direction from a post 52 at one end to which the first part 14 of the strap is secured, to a spindle 54 at the opposing end onto which the second part 18 of the strap is wound. The spindle 54 includes an axially extending slot therein for receiving one end of the second part 18 of the strap prior to winding. The spindle 54 is supported for rotation about its respective spindle axis with the spindle and the post 52 being support parallel to one another and perpendicular to the longitudinal direction at opposing ends of the body 50.

The body 50 further includes two side plates 56 which extend in the longitudinal direction parallel to one another and laterally spaced apart from one another. The spindle 54 and the post 52 are supported perpendicularly to the two plates to span therebetween at the opposing ends of the plates. The post 52 is fixed relative to the plates while the spindle is rotatable relative to the two side plates 56 which form a fixed portion of the body 50.

The body 50 further comprises a top plate 58 which is fixed between the two side plates 56 in connection along respective top edges of the side plates. The top plate 58 is centered in the longitudinal direction between opposing ends of the body and terminates spaced inwardly in the longitudinal direction from both ends of the body to provide access of the strap to the post 52 and the spindle 54 respectively.

A set of racheting teeth 60 are provided on both ends of the spindle at circumferential positions about the spindle evenly spaced thereabout and arranged to rotate with the spindle. The two sets of racheting teeth 60 are located on outer sides of the body opposite one another on opposing outer sides of the two side plates 56.

A retainer member 62 is provided in the form of two flanges 64 which are slidably received in respective slots 66 in the two side plates 56 respectively. The slots 56 extend generally radially from the spindle axis to be aligned generally in the longitudinal direction of the body.

The two flanges 64 of the retainer are formed integrally with one another by a common plate spanning therebetween for common sliding movement in the longitudinal direction into selective engagement with the racheing teeth 60. The retainer 62 is biased into engagement with the racheting teeth by a suitable spring 68 coupled between an opposing end of the plate in relation to the flanges 64 and a depending flange 70 mounted on the top plate.

The teeth 60 are formed to define a ramping surface in engagement with the flanges 64 respectively when the spindle is rotated in a first winding direction to wind the strap onto the spindle. Each ramping surface terminates at a blunt shoulder which prevents rotation of the spindle in an opposing unwinding direction opposite the winding direction when the retainer is engaged with the teeth 60. The retainer only acts to restrict in the unwinding direction as the ramping surfaces in the opposing direction cause the retainer 62 to be automatically biased into the release position against the spring 68 as in operation of a typically racheting mechanism. The retainer 62 may be manually released from the racheting teeth 60 for unwinding as desired.

As a bolt head 72 is provided at one end of the spindle externally from the body 50 and the racheting teeth 60 on the spindle. The bolt head 72 comprises a hexagonal head arranged for mating engagement with the socket member 24 of the tool 12 for positive engagement therebetween when the socket of the tool is mated with the bolt head of the spindle so that the two are rotatably together when the tool is actuated.

A pair of apertures 74 are provided in the side plates 56 respectively in alignment with one another to define a common receptacle extending fully through the body 50 of the tightener which is in alignment with a receptacle axis lying parallel and spaced radially in relation to the socket axis. The apertures are spaced in the longitudinal direction between the spindle 54 and the post 52, and more particularly are spaced in the longitudinal direction between the retainer 62 of the racheting mechanism and the post 52.

In use, when it is desired to operate the strap tightener to tighten the first and second parts of a strap, the second part of the strap is inserted into the slot of the spindle and the spindle is rotated initially until the strap is wound partially onto to the spindle. When it is desired to further tighten the strap using the driven rotary tool, the anchor member 32 is first secured into the receptacle defined by the apertures 74 in the tighener body by slidably displacing the anchor member into the receptacle with the tool bodies being displaced towards one another in the direction of the socket axis and the spindle axis which are aligned with one another.

Once the anchor bar 36 of the tool body is received within the two apertures 74 forming the receptacle on the tightener body, the tool is pivotal relative to the tightener body about an axis of the anchor bar and the receptacle to align the socket of the tool with the bolt head on the end of the spindle at which point the bolt head and socket can be mated with one another. In this instance in addition to the rotary parts of the tightener body and the tool being engaged in mating connection with one another, the tightener body and the tool body are also anchored relative to one another at a location spaced radially from the rotating parts to anchor against any torque applied between the two bodies so that actuation of the rotary driven tool only causes the spindle to rotate without twisting the body from the hand of the user.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of operating a rachet strap tightener using a power driven rotary tool, the rachet strap tightener comprising a tightener body, a spindle rotatably supported about a spindle axis relative to the tightener body for winding a first strap thereon in first direction, a first mating part rotatable with the spindle relative to the tightener body and a ratcheting mechanism arranged to selectively restrict rotation of the spindle relative to the tightener body in an opposing second direction, the tightener body comprising a pair of side plates oriented perpendicularly to the spindle axis and spaced apart from one another along the spindle axis, the power driven rotary tool comprising a tool body, a second mating part arranged to mate with the first mating part of the rachet strap tightener and arranged to be driven to rotate about a drive axis, the method comprising:
   providing an aperture in each of the side plates such that the apertures are aligned with one another along a receptacle axis which is parallel and spaced from the spindle axis so as to slidably receive a portion of the tool body therein;
   anchoring the tool body relative to the tightener body by slidably receiving said portion of the tool body into the apertures in each of the side plates;
   mating the second mating part of the rotary driven tool with the first mating part of the rachet strap tightener; and
   driving the second mating part of the rotary driven tool to rotate the spindle of the rachet strap tightener.

2. The method according to claim 1 wherein one of the mating parts comprises a bolt head and the other mating part comprises a socket which matingly receives the bolt head therein.

3. The method according to claim 1 wherein the first mating part comprises a bolt head and the second mating part comprises a socket arranged to matingly receive the bolt head therein.

4. The method according to claim 1 including anchoring the tool body relative to the tightener body at a location which is spaced radially from the drive axis.

5. The method according to claim 1 including anchoring the tool body relative to the tightener body by sliding the tool body towards the tightener body in a direction of the drive axis.

6. The method according to claim 1 including anchoring the tool body relative to the tightener body by providing an anchoring member on one of the bodies and a receptacle on the other body which matingly receives the anchor member therein.

7. The method according to claim 1 including anchoring the tool body relative the tightener body by providing a receptacle on the tightener body which is arranged to receive a portion of the tool body therein.

8. The method according to claim 1 including locating the apertures spaced between the spindle and a post arranged for anchoring a second strap thereon.

9. The method according to claim 1 including anchoring the tool body relative to the tightener body by providing an anchor member on the tool body which is arranged to be received within a mating receptacle on the tightener body.

10. The method according to claim 9 including supporting the anchor member to extend generally parallel to the drive axis.

11. The method according to claim 10 wherein the second mating part of the rotary driven tool comprises a socket member and wherein the method includes extending the anchor member outwardly in a direction the socket member faces beyond the socket member.

12. The method according to claim 9 including locating the anchor member on the body to be diametrically opposite from a handle of the tool arranged to be gripped by a hand of a user.

13. A rachet strap tightener for use with a power driven rotary tool comprising a tool body and a first mating pad supported for rotation relative to the tool body about a drive axis, the rachet strap tightener comprising:
   a tightener body;
   a spindle rotatably supported on the tightener body for rotation relative to the tightener body about a spindle axis for winding a first strap thereon in first direction;
   a second mating part rotatable with the spindle relative to the tightener body;
   a ratcheting mechanism arranged to selectively restrict rotation of the spindle relative to the tightener body in an opposing second direction; and
   a receptacle on the tightener body arranged to matingly receive an anchor member on the tool body for anchoring the tightener body relative to the tool body;
   the tightener body comprising a pair of side plates oriented perpendicularly to the spindle axis; and
   the receptacle comprising an aperture in each of the side plates aligned with one another along a receptacle axis which is parallel and spaced from the spindle axis to slidably receive a portion of the tool body therein.

14. The tightener according to claim 13 wherein the receptacle is arranged to receive a portion of the tool body therein slidably along an axis lying parallel to the spindle axis.

15. A power driven rotary tool for use with a rachet strap tightener comprising a tightener body, a spindle rotatably supported on the tightener body about a spindle axis for winding a first strap thereon in first direction, a first mating part rotatable with the spindle relative to the tightener body, and a ratcheting mechanism arranged to selectively restrict rotation of the spindle relative to the tightener body in an opposing second direction, the power driven rotary tool comprising:
   a tool body;
   a second mating part supported for rotation relative to the tool body about a drive axis;
   the second mating part being arranged to mate with the first mating part for rotation together about the drive axis; and
   an anchor member on the tool body arranged to be received in a mating receptacle on the tightener body for anchoring the tool body relative to the tightener body;
   the anchor member being located on the body to be diametrically opposite from a handle of the tool arranged to be gripped by a hand of a user.

16. The tool according to claim 15 wherein the anchor member extends generally parallel to the drive axis.

17. The tool according to claim 15 wherein the second mating part comprises a socket member and wherein the anchor member extends outwardly in a direction the socket member faces beyond the socket member.

* * * * *